United States Patent [19]

Schleimann

[11] 3,927,561

[45] Dec. 23, 1975

[54] METHOD AND APPARATUS FOR DETERMINING TIRE QUALITY

[75] Inventor: Peter Schleimann, Steinenbruck, Germany

[73] Assignee: Gebr. Hofmann KG, Darmstadt, Germany

[22] Filed: May 9, 1974

[21] Appl. No.: 468,581

[30] Foreign Application Priority Data

May 22, 1973 Germany............................ 2326046

[52] U.S. Cl. ................................................ 73/146
[51] Int. Cl.² ...................................... G01M 17/02
[58] Field of Search ................................ 73/146, 8

[56] References Cited
UNITED STATES PATENTS
3,780,573 12/1973 Reus ..................................... 73/146

OTHER PUBLICATIONS

Maguire et al., "Sorting Out The Tires," Electronics, Mar. 18, 1968, pp. 125-129.

Lippman, "Programmable Tire Testing Machine," SAE Journal, Sept. 1965, pp. 86-89.

*Primary Examiner*—Donald O. Woodiel
*Attorney, Agent, or Firm*—Cushman, Darby & Cushman

[57] ABSTRACT

A method and apparatus for testing tire quality in which a tire is mounted for rotation about the periphery of a test drum and the lateral, radial and tangential forces detected. The electrical signals produced by the pick-ups are applied to an analyzing circuit to calculate moments and provide an indication of tire quality.

11 Claims, 5 Drawing Figures

METHOD AND APPARATUS FOR DETERMINING TIRE QUALITY

The invention relates to a method of and a device for controlling the quality of tires, especially motor vehicle tires, with regard to nonuniformities of the tire structure, with the aid of the measurement of the forces generated during the rotation of the tire.

It is known that a tire standing on or rolling on a surface generates forces in radial, lateral and tangential directions. These forces can develop, e.g., in the known manner, from nonuniformities of the tire structure. It is known from the German Patent Application 1648761 that measuring the magnitude of a laterally directed force generated by a rolling tire will provide information regarding tire deformities. Furthermore, a device for determining radial tire forces on motor-vehicle wheels is known from the German Patent Application 2010413. Canadian Patent Specification 904,048 describes the determination of tangential force variations by measuring the differences between the speed of rotation of a tire and that of a test drum. In the case of the known methods and devices it is assumed that the applied forces always act on the center of the footprint area of the tire which is applied against the test drum. Besides, it is disregarded in the known methods that the force variations acting in the different directions, influence each other.

From the German Patent Applications 1779156 and 1755329 it is further known that forces acting in radial directions are measured by two pick-ups and that this information is processed independently to provide indication regarding tire quality. It is, however, neglected that the lateral forces also decisively affect the test results obtained in the radial direction.

It is the object of the invention to propose a method and a device by means of which the individual forces which have come to light during the test, can be accurately measured in spite of the reciprocal influence, and a clear indication given of the quality of the tested tire.

This task is solved by the hereinbefore described method of this invention in that, in addition to the forces, at least part of the moments in the footprint area (area of contact with rotating drum or the like) of the tire, which develop as the tangential, radial and lateral forces act on each other and/or offset from the wheel center, are determined electromechanically and/or electronically.

The invention assumes that the tangential and lateral forces as well as the radial forces do not act exactly on the footprint area of the tire, but offset against each other. Further, the invention assumes that the forces influence each other. From this results a reciprocal overlapping of the radial, lateral and tangential forces, whereby additional moments arise due to the relative shifting of the individual points of application of the forces against each other and against the tire surface. These forces and moments act in the footprint area of the tire by menas of which the tire is applied against the roll-off surface, e.g., the magnetic surface of the test drum.

Since the tangential and lateral forces and the moments resulting from the shifting of the points of force overlap each other, separation is not feasible so that only the total of such forces and moments respectively can be determined. However, separation is not required, as the forces and moments acting on the motor vehicle also present themselves as a sum. Accordingly as the tangential or lateral moment acts in the same or in the opposite direction, the sum becomes larger or smaller.

For determining the moments, the force couples occurring in tangential and/or radial directions and the lateral force can be measured. For determining the radial moment, the force couple acting in radial direction and the laterally acting force can be measured. The radial moment is obtained by deducting one of the two forces of the force couple from the other and determining the corresponding moment as well as by determining the moment associated with the lateral force and by deducting one of the two moments from the other.

For determining the total moment in the plane of the footprint area, the force couple acting in tangential direction is measured. The total moment in the plane of the footprint area of the wheel is obtained by deducting one of the two forces of this force couple from the other and by determining the moment corresponding to the force difference.

The device used for carrying out the method according to the invention, is provided in the known manner with a roll-off surface for the tire to be tested, e.g., in the form of a test drum, as well as with pick-ups which measure and preferably convert into electrical signals the magnitude of the forces orginating from the rotating tire.

For solving the set task the device according to the invention has two pick-ups, each provided for the tangential and radial forces and at least one pick-up for the forces in lateral direction. These pick-ups deliver corresponding electrical signals to an analysing circuit.

The analysing circuit is provided with a first difference calculator to which the outputs of the two pick-ups for the radial forces are applied, and with a second difference calculator to which the output of the first difference calculator and the output of the pick-up for the lateral forces are applied. The factors required for the determination of the moments, which are multiplied by the output signals of the second difference calculator and of the pick-up for the lateral forces, are given by the dimensions of the test stand, more particularly the test drum diameter and the position of the pick-ups relative to the test drum and the tire to be tested respectively. In general, the values concerned are constant. Appropriate amplifiers are provided in the analysing electronics.

In addition, the output of the pick-up for the lateral forces can be connected with indicating means for the lateral forces. Furthermore, the analysing circuit can be provided with an integrator to which the output of the two pick-ups for the radial forces are connected. The output of the integrator is connected to an indicator of the radial forces.

For the determination of the total moment in the footprint area, more particularly the plane of the footprint area of the tire, the analysing electronics can be equipped with a differentiator to which the outputs of the two pick-ups for the tangential forces are connected. The output of said differentiator is for the final determination of the total moment multiplied by a factor corresponding to the distance between the pick-up for the tangential forces and the plane through the wheel center.

The present invention provides for a possibility of separating and indicating separately the moments arising due to the shifting of the points of attack of the individual forces. These moments are also the cause of the vehicle vibrations occurring in the three coordination directions in certain speed ranges; they can be utilized, after having been measured, as criteria for the selection of given tolerance values.

The invention will now be described in detail, by way of example, on the basis of the following figures.

Figure 1:
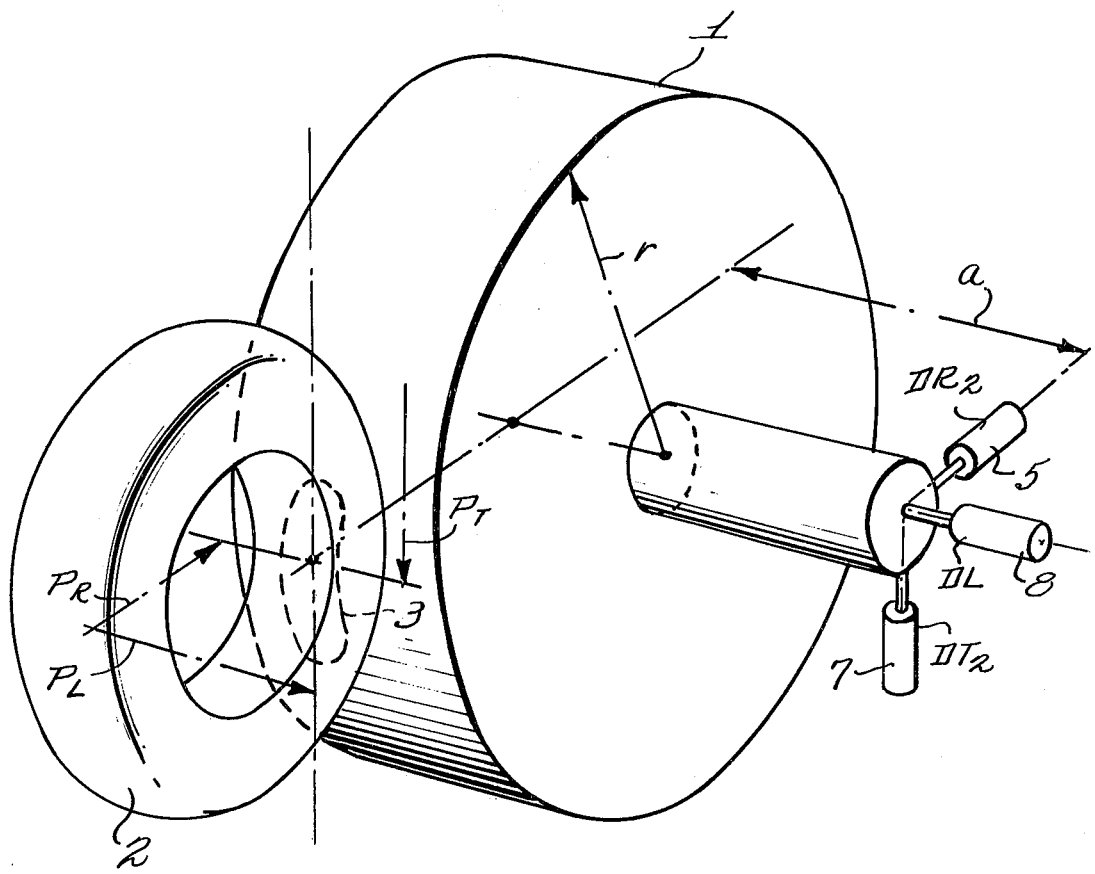
FIG. 1 shows a schematic, perspective view of a motor-vehicle wheel rolling on a test drum, and of the forces acting in the footprint area.
Figure 2:
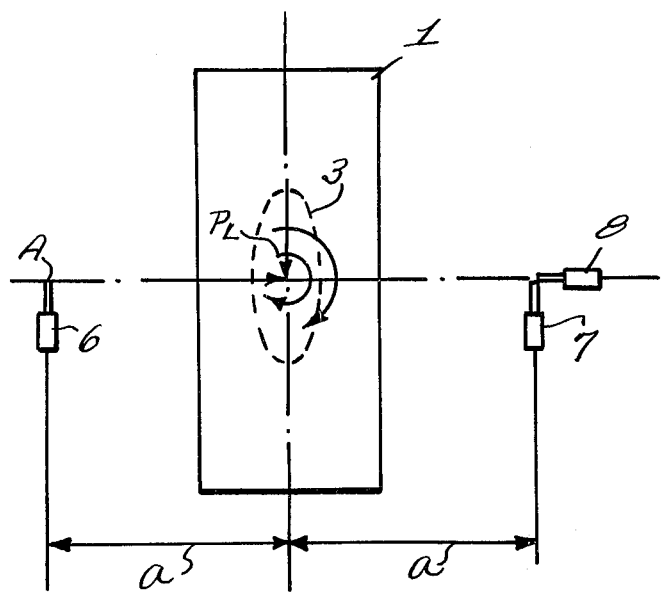
FIG. 2 shows the plane of the footprint area on the test drum and the forces acting in this plane.
Figure 3:
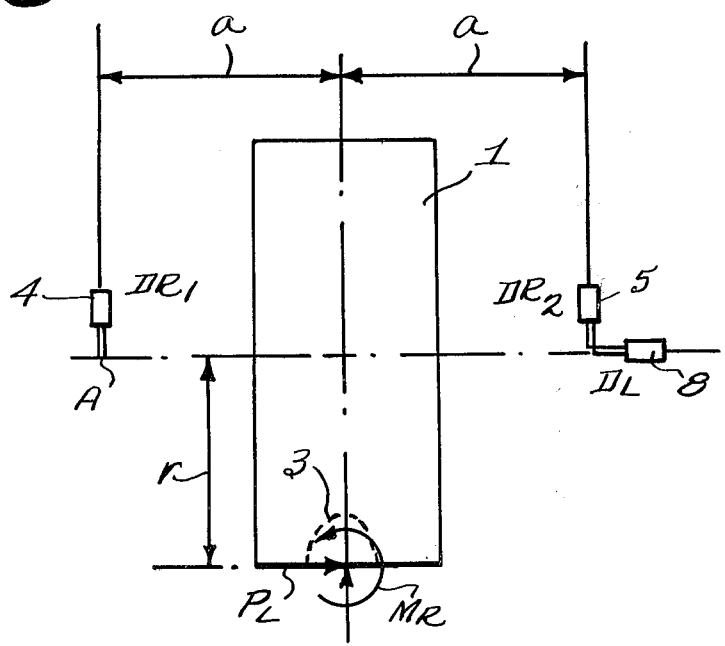
FIG. 3 shows the forces and moments acting in the plane perpendicular to the plane of the footprint area.

The device illustrated in FIGS. 1 to 3 is fitted with a test drum 1 which rotates conventionally in two bearings (not shown). A tire 2, the footprint area of which is marked with dashed lines, is pressed against the test drum 1 by any suitable means (not shown). For measuring the forces in radial direction one pick-up each, 4, 5, are provided on each side of the test drum. For measuring the forces in tangential directions, two pick-ups, 6 and 7, are provided. A pick-up 8 serves for picking up the lateral forces. The pick-ups 4 to 8 may be preferably adapted as force transducers, and in FIG. 1 are arranged on the axle 15 of test drum 1.

While two force transducers for the radial and tangential forces are provided on each side of the test drum 1, only one pick-up 8 is provided for the lateral force, acting along the axle 15.

FIGS. 1 to 3 also show the tangential force $P_T$ and the lateral force $P_L$ which act in the footprint plane 3. $P_R$ indicates the radial force acting perpendicularly to the footprint plane 3. As may be clearly seen from FIG. 1, these forces $P_T$, $P_L$ and $P_R$ act offset from each other in the footprint plane. Due to the offset arrangement and to the shifting of the points of attack of the forces during the rolling of the tire 2 on the test drum 1, additional moments $M_T$ and $M_L$ develop which act about the vertical axis of the tire overlapping each other. These moments $M_T$ and $M_L$ form a total amount $M_{LA}$. The moment $M_R$ is similar to a moment of camber and acts about a perpendicular to the vertical axis of the wheel.

The radial forces picked up by the pick-ups 4 and 5 are designated as $D_{R1}$ and $D_{R2}$. The tangential forces measured by the pick-ups 6 and 7 are designated as $D_{T1}$ and $D_{T2}$, and the lateral forces obtained by means of the pick-up 8 are designated as $D_L$. The moment acting on point A is designated as $M_A$. The following conditions result from FIG. 2:

$M_A = P_T \times a + M_{La} = D_{T2} \times 2a$ (for the point of attack A)
$P_L = D_L$ (for the horizontal plane)
$P_T = D_{T1} + D_{T2}$ (for the vertical plane)

The following conditions result from FIG. 3:

$P_L \times r + P_R \times a + M_R = D_{R2} \times 2a$ (for the point of attack A)
$P_L = D_L$ (for the horizontal plane)

-continued
$P_R = D_{R1} + D_{R2}$ (for the vertical plane)

Figure 4:
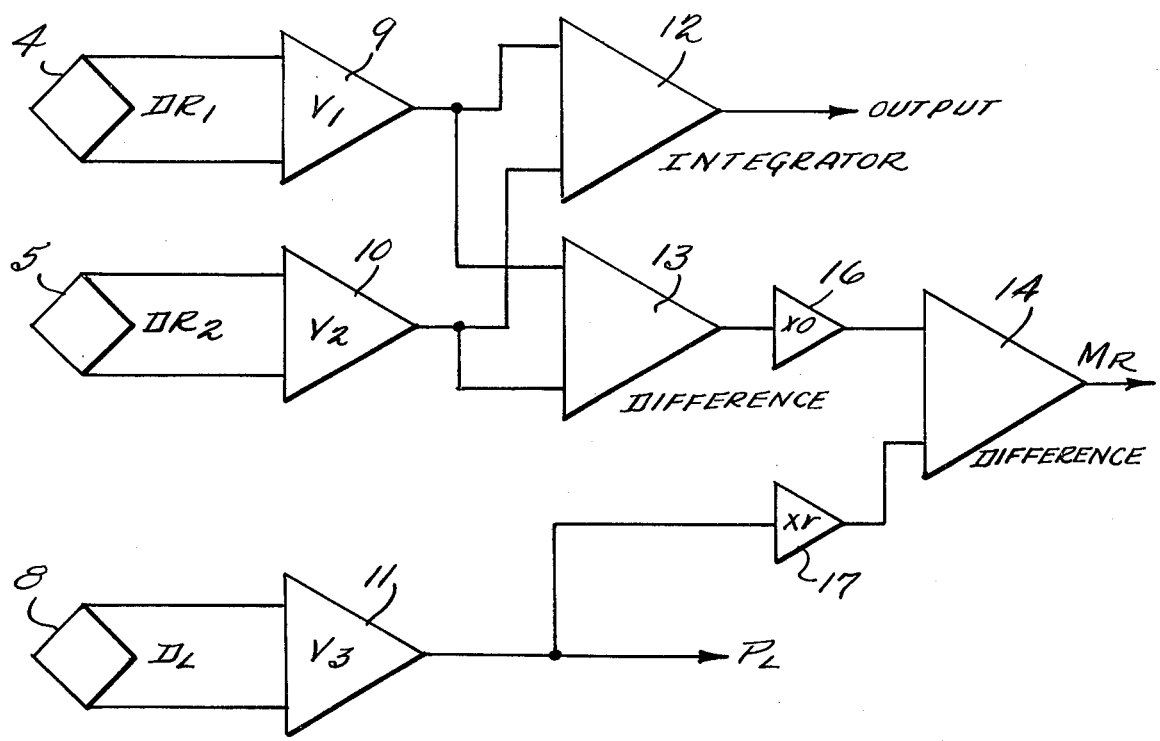
FIG. 4 shows a block diagram of the analysing electronic means.
Figure 5:
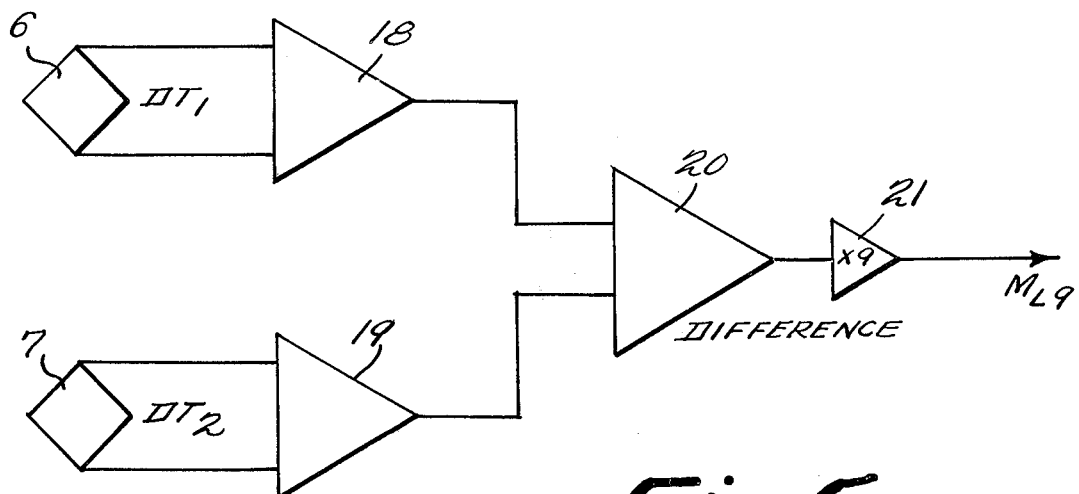
FIG. 5 shows a further part of the analysing electronic means.

From the foregoing conditions the equations required for the determination of the individual moments can be derived:

$M_{La} = D_{T2} \times 2a - P_T \times a$
$M_{La} = D_{T2} \times 2a - (D_{T1} + D_{T2}) \times a$
$M_{La} = (D_{T2} - D_{T1}) \times a$
$M_R = D_{R2} \times 2a - P_L \times r - P_R \times a$
$M_R = (D_{R2} - D_{R1}) a - D_L \times r$ FIGS. 4 and 5 show analysing circuits which serve for calculating the moments $M_R$ and $M_{La}$ which are represented in the formula and which lead to the determination of the moments $M_R$ and $M_{La}$. The values determined by the pick-ups are transmitted to the analysing circuit as follows:

The analysing circuit FIG. 4 evaluates the radial force data furnished by the pick-ups 4 and 5, as well as the radial force measured by the pick-up 8. The analysing electronics includes amplifiers 9, 10 and 11 conventional, which are connected after the pick-ups 4, 5 and 8. The output values of the radial force couple delivered by the amplifiers 9 and 10 are transmitted to an integrator 12 the output of which is connected to indicating means for the radial force $P_R$ (not shown).

In addition, the outputs of the amplifiers 9 and 10 are connected to a difference calculator 13 the output value of which is multiplied, i.e., amplified by a constant factor a, which represents the distance along the axis of drum 1 between the convention pick-up and point of application of the forces. This amplified output value is applied to a further difference calculator 14. The output of the pick-up for the laterally directed force is applied to a further amplifier 17 which multiplies or amplifies the output of the amplifier 11 by a constant factor r which depends on the dimensions of the device and particularly on the drum radius. The output amplified by the factor r is fed into the difference calculator 14. The output of the difference calculator 14 yields the radial moment $M_R$. This output signal can be relayed to an indicating system not shown in the figure.

Furthermore, the output of the pick-up 8 amplified by an amplifier 11 can be transmitted to an indicating system for the lateral force $P_L$ (not shown).

The letter "a" in the figures indicates the distance between the pick-ups 4 to 8 and the center plane of the test drum 1. The letter "r" designates the radius of the test drum 1. These values, a and r, depend on the dimensions of the testing device and are therefore constant. They result from the special position of the individual components of the testing device, especially that of the test drum 1 or the wheel to be tested, as well as from the specific position of the pick-ups 4 to 8.

FIG. 5 shows that part of the analysing circuit which determines the total moment in the footprint plane $M_{La}$. The information obtained by the pick-ups 6 and 7 is converted into electrical output signals which are amplified by the amplifiers 18 and 19 and transmitted to a differentiator 20. The output of the differentiator 20 is multiplied, i.e., amplified by a value corresponding to the known factor a. The output of the amplifier 21 corresponds to the total moment in the footprint area. This output signal can be transmitted to an indicating device not shown in the figure.

Many changes and modifications of the above described embodiment of the invention can, of course, be made without departing from the scope thereof. Accordingly, the scope of the invention is intended to be limited only by the scope of the appended claims.

What is claimed is:

1. A method of determining the quality of tires, with regard to nonuniformities of the tire structure, comprising:
   measuring the forces generated during the rotation of the tire, and
   measuring at least the radial and total lateral moments in the footprint area of the tire which result from the tangential, radial and lateral forces acting on each other and/or offset from the wheel center plane.

2. A method according to claim 1 wherein said step of measuring moment includes measuring the developing tangential and/or radial force couples and at least the lateral force.

3. A method according to claim 1 wherein said step of measuring moment includes measuring the couple of the radial forces and the lateral force.

4. A method according to claim 1 wherein said step of measuring moment includes measuring the couple of tangential forces to determine the total moment acting in the plane of the footprint area.

5. Device for producing an indication of tire quality comprising:
   a test drum having a roll-off surface for rotatably engaging the tire to be tested,
   a plurality of force pick-ups to measure the magnitude of the forces originating from the rotating tire,
   two pick-ups each mounted for measuring the tangential and radial forces and at least one pick-up mounted for the lateral forces, and
   an analysing circuit connected to send pick-ups for producing an output indicating the quality including means for producing an indication of the total lateral moment and means for producing an indication of radial moment.

6. Device according to claim 5, wherein the pickups are disposed to sense the axle of the test drum.

7. Device according to claim 5, wherein the pickups are disposed to sense the axle of the tire to be tested.

8. Device according to claim 5, wherein said analysing circuit includes a first difference calculator to which the outputs of the two pick-ups for radial forces are applied, and a further difference calculator to which the outputs of the first difference calculator and of the pick-up for the lateral forces are applied, so that the output of the first difference calculator is amplified depending on the distance between the wheel center plane and the pick-up for the lateral forces is amplified depending on the test drum diameter and the wheel diameter respectively.

9. Device according to claim 5, wherein the output of the pick-up for the lateral forces is in addition connected to an indicating system for the lateral forces.

10. Device according to claim 5, wherein said the analysing circuit includes a further integrator to which the outputs of the two pick-ups for the radial forces are connected.

11. Device according to claim 5, wherein said the analysing circuit includes a further difference calculator to which the outputs of the pick-ups for the tangential forces are connected, and wherein the output of the differentiator is amplified by a factor depending on the distance between the pick-ups and the wheel center plane.

* * * * *